Dec. 11, 1945.   W. T. BARRANS ET AL   2,390,769
APPARATUS FOR MAKING RETRACTILE CORDS
Filed March 10, 1944
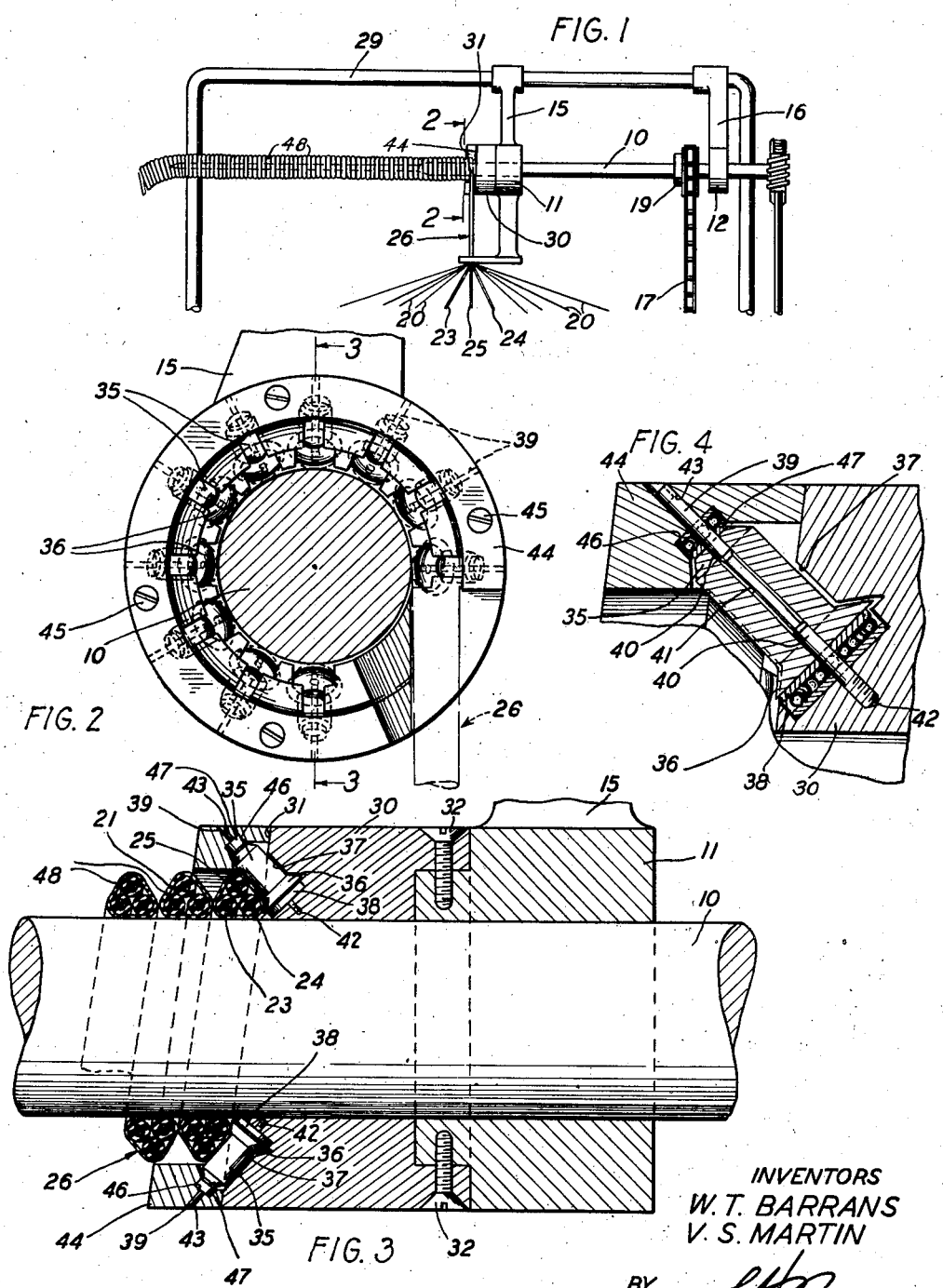
INVENTORS
W. T. BARRANS
V. S. MARTIN
BY
ATTORNEY Patented Dec. 11, 1945

2,390,769

UNITED STATES PATENT OFFICE 2,390,769

APPARATUS FOR MAKING RETRACTILE CORDS

William T. Barrans and Victor S. Martin, Towson, Md., assignors to Western Electric Company, Incorporated, New York, N. Y., a corporation of New York Application March 10, 1944, Serial No. 525,960

4 Claims. (Cl. 87—31)

This invention relates to apparatus for making retractile cords, and has for its object the provision of new and improved apparatus for making retractile cords.

In one method of making retractile cords, a braided covering is formed over a plurality of conductors to form a cord which is helically coiled upon an axial take-up capstan. As such a cord is being helically coiled upon the capstan, the coils thus formed are slid along the capstan by means of a cam which contacts only the portion of the cord adjacent to the periphery of the capstan. This invention provides a new and more effective type of cam for accomplishing that result.

One device embodying the invention comprises an axial take-up capstan for withdrawing braided conductors from a braiding machine and a pusher cam adjacent to the capstan for directing the braided cord along the capstan in a uniform helix, said cam having a groove formed therein of the contour desired in that portion of the retractile cord engaged by the cam.

A complete understanding of the invention may be obtained from the following detailed description of a specific embodiment thereof, when read in conjunction with the accompanying drawing, in which:

Fig. 1 is a fragmentary front elevation of an apparatus embodying the invention;

Fig. 2 is an enlarged, fragmentary vertical section of a portion of the apparatus taken along line 2—2 of Fig. 1;

Fig. 3 is a section taken along line 3—3 of Fig. 2, and

Fig. 4 is a greatly enlarged section of a portion of the apparatus.

Referring now to the drawing, an axial take-up capstan 10 (Fig. 1) rotatably mounted in bearings 11 and 12 formed on arms 15 and 16, respectively, may be rotated by a chain 17 through a sprocket 19 secured to the capstan. The chain 17 is driven by the driving mechanism of a braider (not shown) of a well-known type, which braids textile strands 20—20 into a braided covering 21 (Fig. 3) around three individually insulated conductors 23, 24 and 25 to form a cord 26. The arms 15 and 16 are rigidly secured to a rod 29 forming part of the braider.

An annular member 30 having a helical surface 31 formed thereon is secured to the bearing 11 by screws 32—32 (Fig. 3). Rollers 35—35 having conical surfaces 36—36 formed on the bases thereof are rotatably mounted in the form of a helix in sockets 37—37 formed in the annular member 30 with the outer edges of the conical surfaces 36—36 adjacent to the periphery of the capstan 10. The rollers 35—35 are mounted on thrust bearings, such as a thrust bearing 38 (Fig. 4).

A plurality of bolts 39—39 having bearing surfaces 40—40 formed thereon pass through axial bores, such as a bore 41 (Fig. 4), formed in the rollers 35—35 and are screwed into tapped bores 42—42 formed in the annular member 30. The upper ends of the bolts 39—39 are mounted in bores 43—43 formed in a helical cap 44 which is secured to the member 30 by screws 45—45. Sockets, such as a socket 46, formed in the cap 44 hold thrust bearings such as a thrust bearing 47 against the outer ends of the rollers 35—35. Thus, the rollers 35—35 are rotatably secured on the bearing surfaces 40—40 between the thrust bearings such as the thrust bearings 38 and 47 and may be very easily rotated in the sockets 37—37.

In the operation of the above described apparatus, the capstan 10 is rotated in a counter-clockwise direction, as viewed in Fig. 2, by the sprocket 19 to draw the cord 26 from the braider and to form coils 48—48 of the cord 26 upon the capstan. The conical surfaces 36—36 and the cylindrical body portions of the rollers 35—35 bear against the right side of the cord 26 to force the coils 48—48 to the left, as viewed in Fig. 3. The cylindrical body portions of the rollers 35—35 also press the cord 26 against the capstan, thereby insuring sufficient frictional contact between the capstan and the cord 26 for the capstan to draw the cord thereon. As the cord 26 is drawn on the rotating capstan, the rollers 35—35 are rotated by the portion of the cord lying thereagainst. The rollers 35—35 are easily rotated since the only resistance to their rotation is offered by the thrust bearings such as the bearings 38 and 47 and the bearing surfaces 40—40. Consequently, the rollers 35—35 retard the cord 26 very little.

Since the rollers 35—35 are arranged around the capstan 10 in the form of a helix, the cord 26 is caused to be wound around the capstan in the form of a helix, while at the same time displacement of the conductors 23, 24 and 25 is avoided.

It will be understood that the above described apparatus is only illustrative of the invention which is limited only by the claims.

What is claimed is:

1. In an apparatus for forming retractile cords, an axial take-up capstan for drawing a cord thereon, an annular collar through which the capstan passes, said collar having a helical face and also having a plurality of sockets formed therein, a plurality of flanged rollers having bores formed therethrough, a plurality of thrust bearings for supporting the rollers therebetween, a cap having bores formed therein secured to the helical face, and a plurality of pins having bearing surfaces formed thereon secured in the bores in the rollers and the cap.

2. In an apparatus for forming retractile cords, a collar having a plurality of sockets formed therein, said sockets being formed in a helical line around one face of the collar, an axial take-up capstan extending through the collar, means for rotating the capstan with respect to the collar to draw a covered cord on the capstan, a plurality of rollers rotatably mounted in the sockets, and means for securing the rollers in the sockets in inclined relationship with respect to the capstan for pressing a cord drawn on the capstan along the capstan to form a helix thereof and to prevent the cord from turning about its axis.

3. In an apparatus for forming retractile cords, an axial take-up capstan for coiling a triangular shaped cord, and a plurality of rollers rotatably mounted around the periphery of the capstan along a helical line therearound, the peripheries of said rollers being so inclined with respect to the axis of said capstan that they engage one flat side of a cord and press the cord against and along the capstan, whereby the cord is coiled around and pushed along the capstan but is prevented from turning about its own axis.

4. In an apparatus for forming retractile cords, an axial take-up capstan for coiling a cord thereon, a plurality of rollers having flanges formed thereon and also being provided with cylindrical surfaces formed thereon, and means for securing the rollers in a helical line around the capstan and inclined with respect to the capstan so that the flanges engage one surface of a cord being coiled upon the capstan and push it along the capstan and the cylindrical surfaces engage another surface of the cord and hold it against the capstan.

WILLIAM T. BARRANS.
VICTOR S. MARTIN.